United States Patent [19]

Lebecque

[11] 4,074,924
[45] Feb. 21, 1978

[54] ELECTRICAL CONTACT SYSTEM

[76] Inventor: Maurice G. N. G. Lebecque, 83-904, Clarke Road, Port Moody, British Columbia, Canada, V3H 1L7

[21] Appl. No.: 736,759

[22] Filed: Oct. 29, 1976

[51] Int. Cl.² .......................... B60L 5/36; B60M 1/30
[52] U.S. Cl. .................................. 339/20; 191/22 R; 191/57; 339/182 R
[58] Field of Search .................. 339/5, 20, 21, 22, 23, 339/182, 183; 191/13, 22 R, 57, 59.1

[56] References Cited

U.S. PATENT DOCUMENTS

| 782,311 | 2/1905 | Zalinski | 339/20 |
| 2,703,868 | 3/1955 | Rausenberger | 339/5 P |
| 2,735,079 | 2/1956 | Passarelli | 339/20 |
| 3,166,370 | 1/1965 | Parker | 339/21 R |

FOREIGN PATENT DOCUMENTS 2,002,419  9/1970  Germany ........................... 339/21 R

*Primary Examiner*—Roy Lake
*Assistant Examiner*—Neil Abrams
*Attorney, Agent, or Firm*—Fulwider, Patton, Rieber, Lee & Utecht

[57] ABSTRACT

An electrical contact system that comprises a power bed consisting of a base plate having electrically conducting layers insulated from each other. Embossments are formed on the base plate. Each embossment is spaced from its neighbors so that channels are formed between the embossments. Electrical contacts join parts of each channel with corresponding, electrically conducting layers in the channels. Electrical contacts are provided so that electricity can be supplied to the electrically conducting layers of the base plate. A collector having electrical contacts to contact the electrical contacts of the channels is movable along the channels.

11 Claims, 9 Drawing Figures

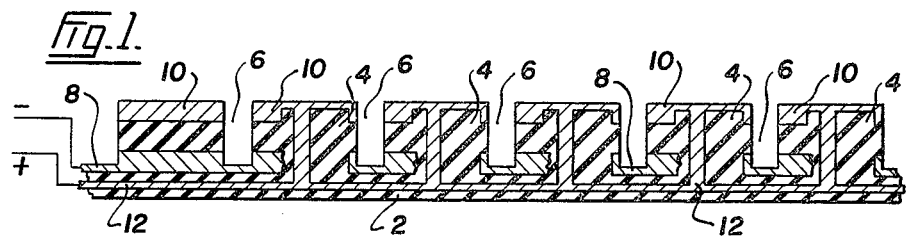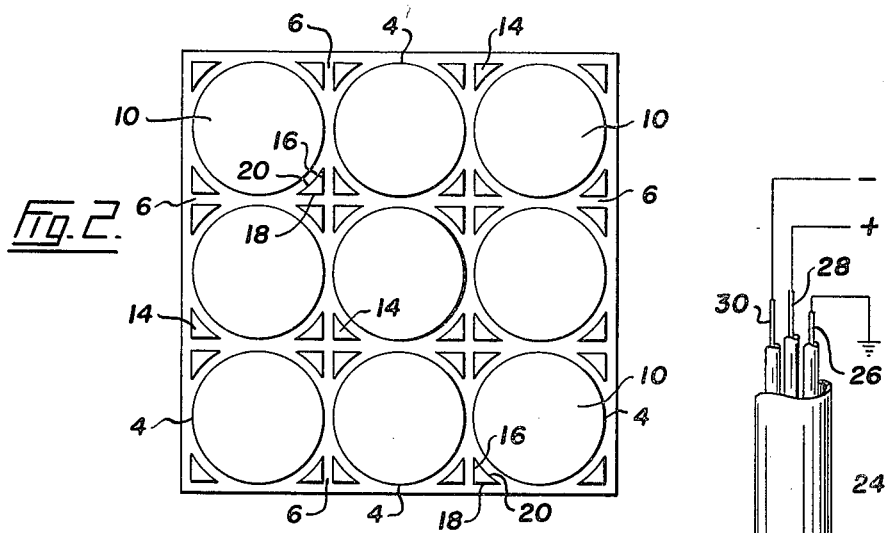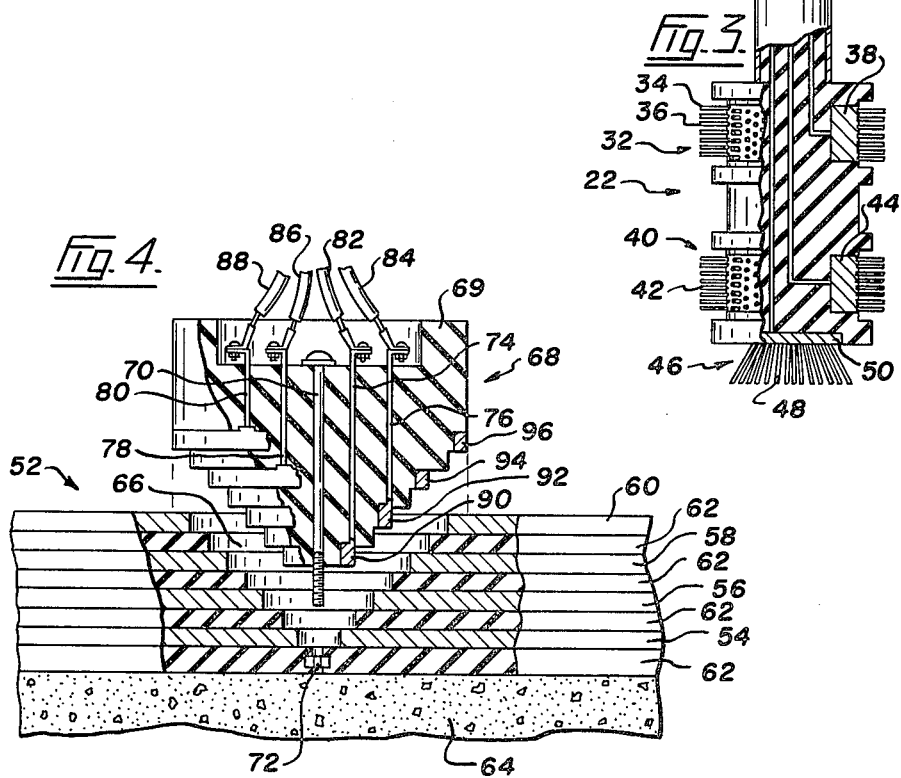

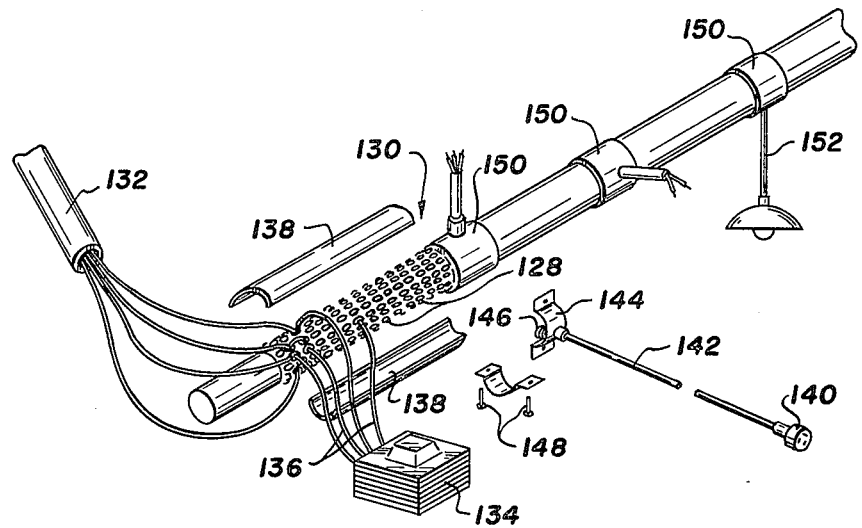
Fig. 6.
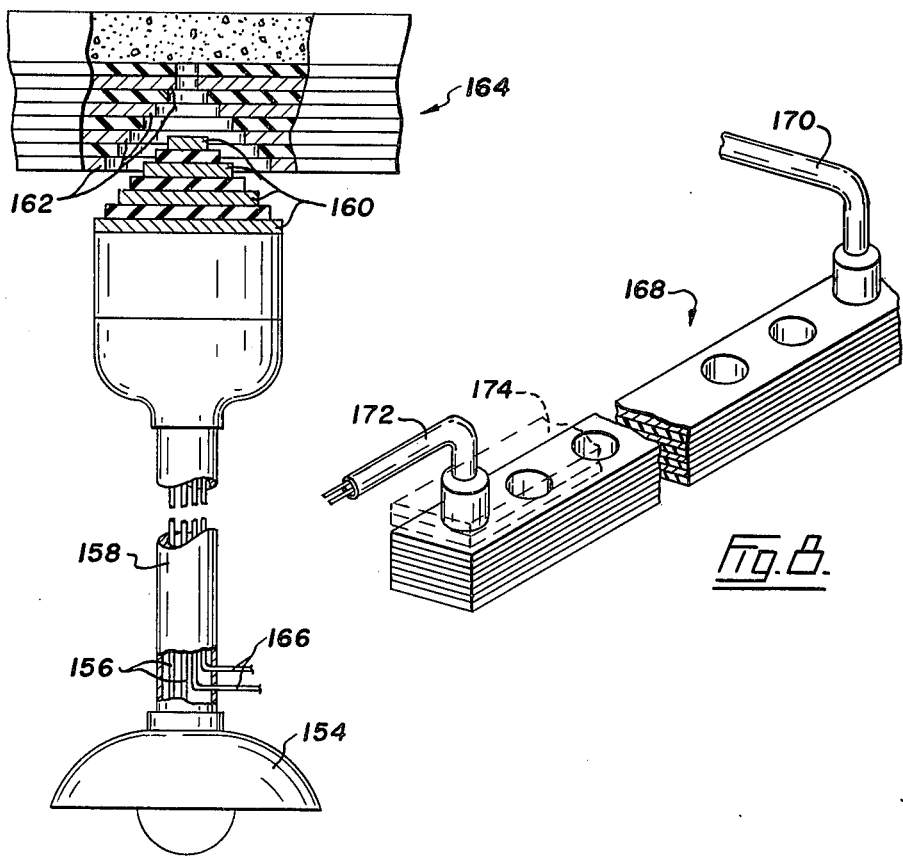
Fig. 7.
Fig. 8.

ELECTRICAL CONTACT SYSTEM

FIELD OF THE INVENTION

This invention relates to an electrical contact system. The invention finds application in a wide variety of electrical systems, for example systems in which a moving object, driven by electrical power, draws the power from a contact system beneath, about or above the route. The contact system of the present invention is also applicable to static systems and, where it is desired to move an electrical appliance to a fresh location, has the advantage that the system is independent of the fixed, prior position of electrical outlets.

PRIOR ART

Electric supply systems are well known in which the source of power is a contact rail running alongside a fixed path, for example, as used in electrical railway systems and, particularly, in underground electric railway systems or where a power collector collects the electricity from an overhead wire, for example, on certain railway systems, on trolley buses and in factories. However, the disadvantage of putting the pick-up rail or track on the ground is clear wherever it may be contacted by a pedestrian. Systems in which overhead rails are used have the disadvantage that contact can be erratic. An example of this erratic contact is with trolley buses where the pick-up frequently breaks contact with the overhead wire, particularly at corners. The result is delay in the traffic while the contacts are moved back into their correct position on the overhead wires.

In the existing static electrical systems there is the disadvantage that appliances must be positioned near an outlet in the circuit. It is not desirable to move the appliance too far from the outlet since that would involve an excessively long lead. The only alternative is to introduce further outlets.

SUMMARY OF INVENTION

The present invention seeks to avoid the disadvantages of the prior art and, in particular, provides a system of providing electricity. In one embodiment it provides a system in which a moving article can aquire electrical power from a contact system simply and efficiently. The direction of the moving article is not as limited as with existing moving systems, for example, trolley buses, so that the vehicles have greater mobility. The present invention is, however, also applicable to systems in a house or in a factory and permits an infinite variation in the position of supply.

Accordingly, in one aspect, the present invention is an electrical contact system that comprises a power bed consisting of a base plate, including at least two electrically conducting layers insulated from each other, and a plurality of embossments formed on the base plate, each embossment being spaced from its neighbours to define with the base plate channels between the embossments; first electrical contacts at a first part of each channel in electrical contact with a first electrically conducting layer in the base plate; second electrical contacts at a second part of each channel in electrical contact with a second electrically conducting layer in the base plate, an insulator between the first and second contacts; means to permit supply of electricity to the base plate; and a collector having first electrical contacts to contact said first electrical contacts of the channels and second electrical contacts to contact said second electrical contacts of the channel. The collector is preferably movable along the channels.

The embossments are usually circular embossments arranged in straight lines as with moving systems this can permit a collector to change direction gradually, that is following the circular edge of the embossments. However, particularly where only straight line travel is required, the embossments may be square or rectangular in section.

BRIEF DESCRIPTION OF DRAWINGS

The invention is illustrated, merely by way of example, in the accompanying drawings in which:

FIG. 1 is a section through a power bed useful in the electrical contact system of the present invention;

FIG. 2 is a partial plan view of the power bed illustrated in FIG. 1;

FIG. 3 illustrates a collector according to a further aspect of the invention;

FIG. 4 illustrates the power supply to a power bed useful in the present invention;

FIGS. 5a and 5b and 6 illustrate embodiments according to the invention; and

FIGS. 6 to 8 show applications of systems according to the invention.

DESCRIPTION OF PREFERRED EMBODIMENTS

Figure 5A:
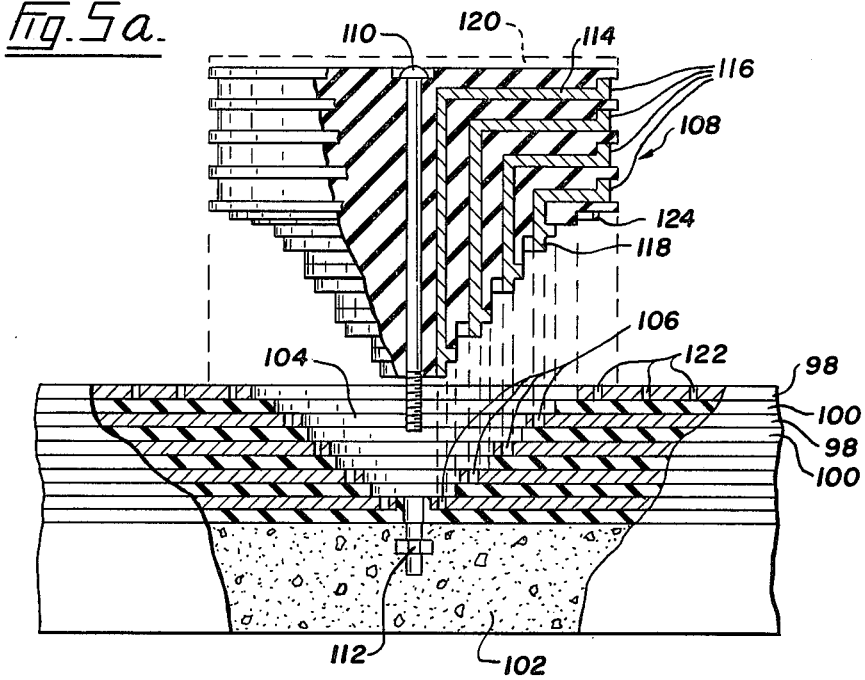

The drawings illustrate an electrical contact system that comprises a power bed consisting of a base plate 2 and a plurality of embossments 4 formed on the base plate 2. Each embossment is spaced from its neighbours to define, with the base plate 2, channels 6 between the embossments 4. There are electrical contacts to differing parts of each channel 6. In FIG. 1 the base plate and the exterior of the base of each embossment are provided with a first electrically conducting layer 8 that makes up a first electrical contact. There are areas 10 of a conducting material formed on the upper surface of the embossments 4. These areas 10 form second electrical contacts at a second part of each channel. It should be noted that in the embodiment illustrated in FIG. 1 the first electrical layers 8 are connected to negative and the second electrical contacts in the form of areas 10 are connected to positive through electrically conducting layers 12 formed in the power bed and in electrical contact with each second layer 10 so as to be able to carry electricity to the second layer 10. It will be appreciated that the particular polarity of the electrical supply to each layer is not normally important.

In the embodiment illustrated in FIG. 1 the base plate 2 and the embossments 4 are formed of an insulating material, for example a plastic material, and the layers 10 and conductors 12 are of a conducting material, for example metal such as copper, applied to different parts of the surfaces of the insulating material.

As shown in FIG. 2, which merely shows a portion of the surface of a power bed according to the present invention, the embossments 4 are circular embossments arranged in straight lines. Such an arrangement means that channels 6 of a regular size are not formed on all portions of the base plate 2 by the circular embossments 4. In the space between four adjacent embossments 4 it is, in a preferred embodiment, desirable to incorporate generally triangular embossments 14. Each triangular embossment 14 has two sides 16 and 18 generally coextensive with the channels 6 between embossments 4.

A third side 20 of the generally triangular embossment 14 is spaced from and substantially parallel to a part of the nearest embossment 4. Thus the provision of triangular embossment 14 ensures that the channel 6 is of substantially uniform width over the whole surface of the power bed. This facilitates the steering of a collector through the channels 6.

The embossment system shown in FIG. 1 does not have a ground. That is it is generally suitable for low voltages, for example, with electrical toys. However, where normal domestic voltages are to be used then, of course, it is desirable that the base plate be grounded as discussed later.

FIG. 3 illustrates a collector 22 useful in the system of the present invention. The collector comprises a rod 24 having within it (a) a conductor 26 to ground, (b) conductor 28, which is used to collect positive electricity and (c) conductor 30 used to collect negative electricity. Rod 24 is of an insulating material in which the conductors 26, 28 and 30 are embedded. Rod 24 has a head generally indicated at 32. Head 32 has a plurality of contacts. These electrical contacts comprise a first electrical contact 34 which is electrically connected to ground contact 26. The first contact 34 is positioned to align with a grounded layer on an embossment of the system according to the invention. First contact 34 comprises conducting brushes 36 embedded in a conducting base 38. Base 38 is in electrical contact with the conductor 26. Similarly a second electrical contact 40 comprises a brush 42 formed in a conducting base 44 that is in electrical contact with the second (positive) conductor 28. A third contact 46 for negative electricity comprises a brush 48 embedded in a conducting base 50 that is in electrical contact with third or negative conductor 30. It can be seen that the brushes 36, 38 and 40 contact the appropriate part of an embossment to pass current from the embossment along the conductors 26, 28 and 30 to the appropriate connectors on the vehicle or appliance to receive the electrical power.

It should be noted that in addition to the brushes 36, 42 and 48 smooth metal plates may be used as a conducting material. Desirably, rod 24 is flexible and can be urged into contact with a corresponding power bed by, for example, a spring or a hydraulically extensible limb.

FIG. 4 illustrates the power supply to a power bed 52 made up of base plates that comprise a first electrical conducting layer 54, a second electrical conducting layer 56, a third such layer 58 and a fourth electrically conducting layer 60, the last at the surface of the power bed 52. All these electrically conducting layers are separated by insulating layers 62 and the bed 52 is mounted on foundation 64. The first and the fourth layers 54 to 60 and the insulating layers 62 are formed with holes, increasing in diameter to the top, so that a tiered opening 66 is formed in the power bed 52. The tiered arrangement ensures that a small part of each of the first to the third conducting layers 54 to 58 is free of insulator 62 and thus available for electrical contact at the edges of the tiered opening 66.

An embossment 68 is set in opening 66, and is secured in the opening 66 by a bolt 70 engaging a nut 72 secured in an insulating layer 62, as shown, or in the foundation 64. Embossment 68 comprises an insulator body 69 having a first conductor 74, a second conductor 76, a third conductor 78 and a fourth conductor 80 formed in it. At their upper ends these conductors have terminals to contact supply wires 82, 84, 86 and 88 respectively. At the lower ends the conductors 74 to 80 end in the rings 90 to 96 respectively. These rings each make contact with an uncovered part of an electrically conducting layer 54 to 60. It can be seen that by this means power is fed to the individual layers of the power bed 52. Clearly as many embossments 68 as are required can be used. The polarity of the layers can be chosen as desired.

Figure 5B:
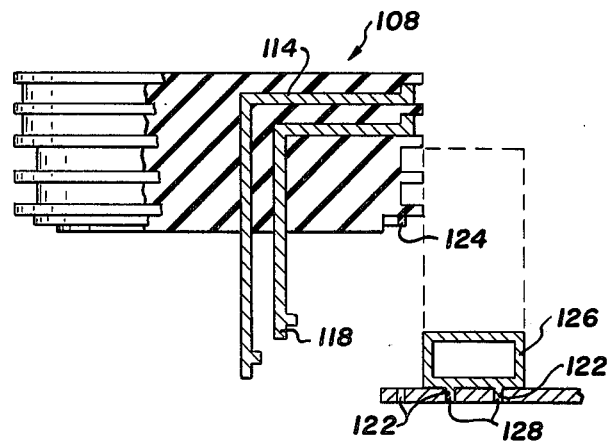

An embossment used to supply power to a collector is shown in FIGS. 5a and 5b. The power to be supplied is taken from a power bed which receives the power as shown for example, in FIG. 4. The power bed in FIG. 5a comprises electrically conducting layers 98 separated from each other by insulating layers 100 and mounted on a foundation 102. The power supplied may, for example, be of the polarities indicated by these layers. As in FIG. 4 a tiered opening 104 is formed. The projecting portions of the conducting layer 98 are provided with holes 106 to facilitate electrical contact with an embossment 108 located in tiered opening 104 by a bolt 110, engaging in a nut 112 located in foundation 102. Positioned within embossment 108 are conductors 114 that extend at their upper ends to contact conducting areas 116 on the exterior of the embossment 108. At the lower ends they are each provided with contact means including prongs generally indicated at 118 which abut the electrically conducting layers 98. The prongs formed on the contact means 118 extend into the holes 106 formed in the conducting layers 98. This facilitates good electrical contact and also helps to locate the embossment 108 within the tiered opening 104.

It will thus be seen that power collected from the electrically conducting layers 98 is conducted through the conductors 114 positioned within the embossment 108 to the conducting areas 116. At this point they are contacted by a collector, for example of the type shown in FIG. 3. Of course the collector will have a collecting means, for example a brush, to contact each individual conducting area 116. However, in this matter it will be appreciated from examining FIG. 5a that the system is capable of providing multiphase current. If only single phase current is used, then, for example, a collector can be used with blank or non conducting portions contacting certain of the conducting areas 116.

A ground can be provided either by using one of the conducting areas 116 or by positioning a conducting area 120 on top of the embossment 108 as shown in dotted lines in FIG. 5a. Again the polarity of each of the layers will be selected as desired. Generally speaking the base of the corridor, that is upper layer 98, is negatively charged.

The upper conducting layer 98 in FIG. 5a is shown with a plurality of holes 122 near the edge of embossment 108. The inner holes 122 engage projections 124 formed on the underside of the embossment 108 to facilitate location but the other two holes 122 on each side of the embossment 108 have a function that is illustrated in FIG. 5b. FIG. 5b shows a detail of an alternative method of selecting only certain conducting areas 116 to contact a collector. It comprises a corridor filler 126 located by pegs 128 in two of the holes 122. The height of the corridor filler 126 can be selected so that it blanks off the desired number of conducting areas 116. The upper surface of the corridor filler 126 contacts the upper electrical conducting layer 98 and, thus, has the same polarilty as that upper layer. In all other respects the structure of FIG. 5b can be the same as in FIG. 5a.

FIG. 6 illustrates variant of the present invention. The embossments 128 in FIG. 6 are mounted on a rod 130. That is the base plate is circular in section. The various conducting layers, equivalent to the layers 54, 60 in FIG. 4 and layers 98 in FIG. 5a are circular in section and are disposed within the rod 130. Power is supplied to the system through a main cable 132 by removal of some of the embossments 128 and their replacements by embossments such as those illustrated in FIG. 4. All embossments, as in all embodiments in the present invention may either by screw-in, or a snap-in fit in the base plate. An aspect of the present invention illustrated in FIG. 6 is the use of a transformer 134 which transforms the power supplied by the cable 132 and thus permits the possibility of a supply of low voltage current to a whole power bed by connecting outgoing wires 136 from transformer 134 to power beds within the cable 130. The rod 130, as in all embodiments of the present invention, can have extra circuits built into it which need not be connected until required. Embossments 128 are covered by shield 138 once the appropriate contacts have been made.

As illustrated somewhat diagrammatically in FIG. 6a a variety of fittings can be attached to the rod 130. These include a conventional socket 140 attached by a lead 142 to a collector 144 that fits within a channel way between embossments. The collector head 144 is located by circular sections 146 that are bolted together by bolts 148 and thus located in a fixed position around the rod 130. In addition, a simple movable outlet 150 can be positioned. The outlet 150 can be moved up and down the rod 130 by having a collector analogous to collector 144 associated with it. It can also be rotated around the rod 130 in the same manner. Reference numeral 152 illustrates a simple light fixture attached to a simple outlet 150.

FIG. 7 illustrates the mounting of a light fixture 154 to which power is supplied by cables 156 located within a tube 158. Cables 156 contact two of the conducting layers 160 which, in turn, are in contact with conducting layers 162 in a power bed 164. Generally the outermost layer 162 will be ground. This system also permits extra cables 166 to be used to provide power to another fitting.

A system similar to FIG. 7 is illustrated in FIG. 8. FIG. 8 shows a power bed 168 of a structure analogous to that shown in FIG. 4 and in FIG. 5a. A fitting 170 provides power to the layers of the bed using a fitting similar to that shown in FIG. 7. Power is removed from the bed 168 by fitting 172. There is provision for additional layers 174 as shown in dotted outline.

The present invention provides an electrical contact system that permits easy relative movement of the two parts, the power bed and the collector of the system. Excellent electrical contact is maintained whether the collector is moving over the power bed at considerable speed, for example, a trolley bus or a train, or whether the collector may be moved relatively infrequently, for example with an electrical appliance. The structure of the embossment is such that the collector can move along a wide variety of paths and still remain in contact with the power bed. Changes of direction are easily accommodated by the generally circular configuration of the channels, for example, channel 6 as shown in FIG. 2. However, straight line movement is also possible and, in those circumstances, it may be desirable simply to have rectangular or square embossments.

A further advantage of the invention is the use of one power bed to supply the electrical needs of electrical apparatus, for example, vehicles having widely varying power requirements. This can be done simply by using a collector for each piece of apparatus that makes contact only with a predetermined number of electrically conducting layers predetermined that is by the power requirement of the apparatus. Collectors can be designed for a particular power requirement or a standard collector can be varied by blanking out some of the electrical contacts of the collector.

I claim:

1. An electrical contact system that comprises a power bed consisting of a base plate including at least two electrically conducting layers insulated from each other and a plurality of discrete embossments, formed on the base plate, and arranged in spaced rows, each embossment in each row being spaced from its neighbours in that row by about the same space as between the rows, each embossment being spaced from its neighbours to define with the base plate channels between the embossments;

first electrical contacts at a first part of each channel in electrical contact with a first electrically conducting layer in the base plate channel;

second electrical contacts at a second part of each channel in electrical contact with a second electrically conducting layer in the base plate;

an insulator between the first and second contacts;

means to conduct a supply of electricity to the electrically conducting layers of the base plate; and a collector having first electrical contacts to contact said first electrical contacts of the channels and second electrical contacts to contact said second electrical contacts of the channel, said collector being movable along the channels.

2. A system as claimed in claim 1 in which the embossments are circular and arranged in straight lines.

3. A system as claimed in claim 2 in which the space between four adjacent embossments includes four generally triangular embossments, each having two sides co-extensive with the channels between embossments and a first side spaced from and substantially concentric with a part of the nearest embossment.

4. A system as claimed in claim 1 in which the base plate has an upper surface of a conducting material to define the first electrical contact for the channel and in which there are discrete conducting areas formed on each embossment to define the second electrical contact.

5. A system as claimed in claim 1 in which the base plate and the embossments are formed of an insulating material;

a first conducting area applied to at least the upper surface of the base plate to define said first electrical contacts and a second conducting area formed on a part of each embossment as the second electrical contact;

a conductor within the base plate and in electrical contact with each second area to carry electricity to the second area.

6. A system as claimed in claim 1 including a ground contact at each embossment and a ground contact in the collector that is aligned with the ground contact of the embossment when the power bed and the collector are in contact.

7. A system as claimed in claim 1 in which the power bed is flat.

8. A system as claimed in claim 1 in which the power bed is circular.

9. A system as claimed in claim 1 in which the collector has brush contacts.

10. A system as claimed in claim 1 in which the collector is mounted on a flexible rod urged into contact with the power bed.

11. A system as claimed in claim 1 including means to prevent contact between electrical contacts in the channels and electrical contacts in the collector.

* * * * *